US008444282B2

(12) United States Patent
Igarashi et al.

(10) Patent No.: US 8,444,282 B2
(45) Date of Patent: May 21, 2013

(54) DISPLAY DEVICE

(75) Inventors: Takahiro Igarashi, Minato-ku (JP);
Tsuneo Kusunoki, Minato-ku (JP);
Takashi Tamura, Minato-ku (JP);
Tomokazu Hino, Shinagawa-ku (JP)

(73) Assignee: Sony Corporation, Tokyo (JP)

( * ) Notice: Subject to any disclaimer, the term of this patent is extended or adjusted under 35 U.S.C. 154(b) by 1045 days.

(21) Appl. No.: 12/446,582

(22) PCT Filed: Nov. 7, 2007

(86) PCT No.: PCT/JP2007/071658
§ 371 (c)(1),
(2), (4) Date: Apr. 22, 2009

(87) PCT Pub. No.: WO2008/056713
PCT Pub. Date: May 15, 2008

(65) Prior Publication Data
US 2010/0002413 A1    Jan. 7, 2010

(30) Foreign Application Priority Data

Nov. 7, 2006   (JP) .................. 2006-302048

(51) Int. Cl.
*F21V 9/16*   (2006.01)
(52) U.S. Cl.
USPC ............... 362/84; 257/40; 313/502; 313/503

(58) Field of Classification Search
USPC .................................. 362/84; 313/502–503
See application file for complete search history.

(56) References Cited

U.S. PATENT DOCUMENTS

| | | | | |
|---|---|---|---|---|
| 7,250,715 | B2 * | 7/2007 | Mueller et al. | 313/485 |
| 7,311,858 | B2 * | 12/2007 | Wang et al. | 252/301.4 F |
| 7,356,054 | B2 * | 4/2008 | Hama et al. | 372/21 |

FOREIGN PATENT DOCUMENTS

| | | |
|---|---|---|
| JP | 2004 163902 | 6/2004 |
| JP | 2006-47975 | 2/2006 |
| JP | 2006 47975 | 2/2006 |
| JP | 2006-49799 | 2/2006 |
| JP | 2006 49799 | 2/2006 |
| WO | WO 2005/103199 A1 | 11/2005 |
| WO | WO 2005/111707 A1 | 11/2005 |

OTHER PUBLICATIONS

Office Action issued Aug. 21, 2012 in Japanese Application No. 2006-302048.

* cited by examiner

*Primary Examiner* — Kimberly Rizkallah
*Assistant Examiner* — Caleb Henry
(74) *Attorney, Agent, or Firm* — Oblon, Spivak, McClelland, Maier & Neustadt, L.L.P.

(57) ABSTRACT

A display device capable of expressing a particularly superior red color, for example, a red color of the sRGB standard, is provided. A display device 1 is composed of a red fluorescent body in which the red chromaticity point ($x_R$, $y_R$) satisfies $x_R \geq 20.640$ and $y_R \leq 0.330$, and a green fluorescent body.

19 Claims, 6 Drawing Sheets

DISPLAY DEVICE

TECHNICAL FIELD

The present invention relates to a display device equipped with a light source device having at least a spontaneous light-emitting body and a fluorescent body.

BACKGROUND ART

In recent years, the display device has advanced in slimming down, and a display device called a FPD (flat panel display) has become widely used. The FPD is classified based on the light emission principle, and studies on various FPDs are being carried out, such as an electro luminescence display, a plasma display, etc.

In particular, the liquid crystal display device has a high penetration ratio compared with other types of display devices, and attracts attention, and the demand for display characteristics (image quality) is particularly strong.

Meanwhile, in the display device, when displaying an image captured by an image capture device such as a camera or a scanner, there is a case that color information is not accurately reflected. That is, there is a case that deviation is caused in color expression between the image capture device and the display device.

This is often caused by that the standard defining color expression differs between the display device and the image capture device. That is, when a color that is defined on one hand is not defined on the other hand or a color that can be expressed on one hand is not in the range that can be expressed on the other hand, color expression deviation is caused.

Regarding this issue, as a standard color space for the computer display, the sRDB standard was established as an international standard (IEC61966-2-1) in October of 1999. This sRGB standard was established for the purpose of standardizing color reproducibility and color space that have been notably different manufactures by manufactures and devices and devices.

By standardizing color reproducibility between televisions, digital still cameras, and printers and mobile devices, it becomes possible to match the image color information expressed by mobile devices and the image color information expressed by input/output devices. The sRGB standard clearly defines the relationship between video signals RGB and colorimetry values by matching the chromaticity points of three primary colors (RGB) to the colorimetry parameters of Rec. 709 recommended by ITU.

As the characteristics (elements constituting image quality) demanded for display devices, color reproducibility can be given. As the color reproducibility is broader, versatile color expressions become possible, so that color reproducibility is important. However, as the color reproducibility expands, the center wavelength of an emission spectrum of each color (for example, red, green, blue) tends to depart from the wavelength (555 nm) that is high in the distinct vision sensitivity for human beings, and the spectrum width tends to become narrower, so that the luminance decreases. That is, color reproducibility and luminance are in a so-called trade-off relationship.

To constitute a display device meeting the above-described sRGB standard, in this trade-off relationship, the color reproducibility must be pursued while avoiding extremely damaging the luminance.

However, the color reproducibility of display devices is insufficient, and the color expression meeting the above-described sRGB standard has not been accomplished.

For example, in a display device employing a method of illuminating a liquid crystal using a light source device separately provided, a so-called white LED has been known as the light source device, in which fluorescent bodies each bearing emission of at least one color and a light-emitting body (light emitting diode) bearing emission of a wavelength shorter than the emission wavelength band of these fluorescent bodies are combined. However, in the configuration that has been regarded as the mainstream in the past, in which YAG:Ce is used for the fluorescent body bearing emission of yellow (yellow fluorescent body), the emission spectrum of the fluorescent body spreads in a broad range from the green gamut to the red gamut.

Because of this, if the light from this fluorescent body is caused to pass a color filter, the emission spectrum of another color comes to be mixed a lot in the green color filter and the red color filter, and pure green color and red color cannot be developed.

Further, a proposal has been made to try to increase the chromaticity points that can be expressed, using a green fluorescent body and a red fluorescent body (for example, see Patent Document 1).

However, even if the color reproducibility is blindly improved, luminance decrease is accompanied, so that this has the opposite effect that the quality of the display device decreases. That is, it is desirable to try to accomplish improvement in the color reproducibility by selectively enabling color expressions that are required by the sRGB standard.

The chromaticity point of red color in the sRGB standard is (0.640, 0.330), and it is regarded difficult to express this chromaticity point. The measured chromaticity point of red color of a currently commercially available display device for mobile use was (0.632, 0.351). The display device measured is a product called a wide color gamut mobile display, however, because the fluorescent body used in the white LED is a yellow fluorescent body, it is believed that the color expression for red is insufficient.

Red plays a particularly important role in the color reproducibility, as the eye-catching color (the color high in the eye-catching property in color engineering), separately from the distinct vision sensitivity, however, it is regarded as difficult to constitute a display device that can express red color of the sRGB standard.

[Patent Document] Japanese Unexamined Patent Application Publication No. 2004-163902

DISCLOSURE OF THE INVENTION

The present invention has been made in view of the above-described problem, and aims to provide a display device that is capable of expressing a particularly superior red color, for example, a red color of the sRGB standard.

A display device according to the present invention is characterized in being equipped with a light source device that includes at least a light-emitting body, a green fluorescent body having the composition shown by Chemical Formula 1 described below, and a red fluorescent body having the composition shown by Chemical Formula 2 described below.

Also, the display device according to the present invention is characterized in that the red color chromaticity point ($x_R$, $y_R$) with respect to emission of the red fluorescent body satisfies $x_R \geq 0.640$ and $y_R \leq 0.330$.

$(Ba_aSr_{(2-a)})SiO_4$:Eu (wherein $0 \leq a \leq 2$)   Chemical Formula 1

$CaAlSiN_3$:Eu (wherein Eu density is 1 mol % to 6 mol %)   Chemical Formula 2

According to the display device according to the present invention, because the display device is equipped with the light source device including a green fluorescent body having the composition shown by the above-described Chemical Formula 1 and a red fluorescent body having the composition shown by the above-described Chemical Formula 2, it becomes possible to express a particularly superior red color, for example, the red color of the sRGB standard, starting with the case that the red chromaticity point ($x_R$, $y_R$) satisfies $x_R \geqq 0.640$ and $y_R \leqq 0.330$.

BEST MODE FOR CARRYING OUT THE INVENTION

Below, an embodiment of the present invention is described referring to drawings.

A display device according to the present embodiment is the one equipped with a light source device having a so-called white LED. The light source device includes a fluorescent body having the composition shown by Chemical formula 1 (silicate fluorescent body) serving as a green fluorescent body, a fluorescent body having the composition shown by Chemical Formula 2 serving as a red fluorescent body, and a blue LED serving as a light-emitting body, and these fluorescent bodies and light-emitting body constitute the white LED.

$(Ba_aSr_{(2-a)})SiO_4$:Eu (wherein $0 \leqq a \leqq 2$)    Chemical Formula 1

CaAlSiN$_3$:Eu (wherein Eu density is 1 mol % to 6 mol %)    Chemical Formula 2

Figure 1:
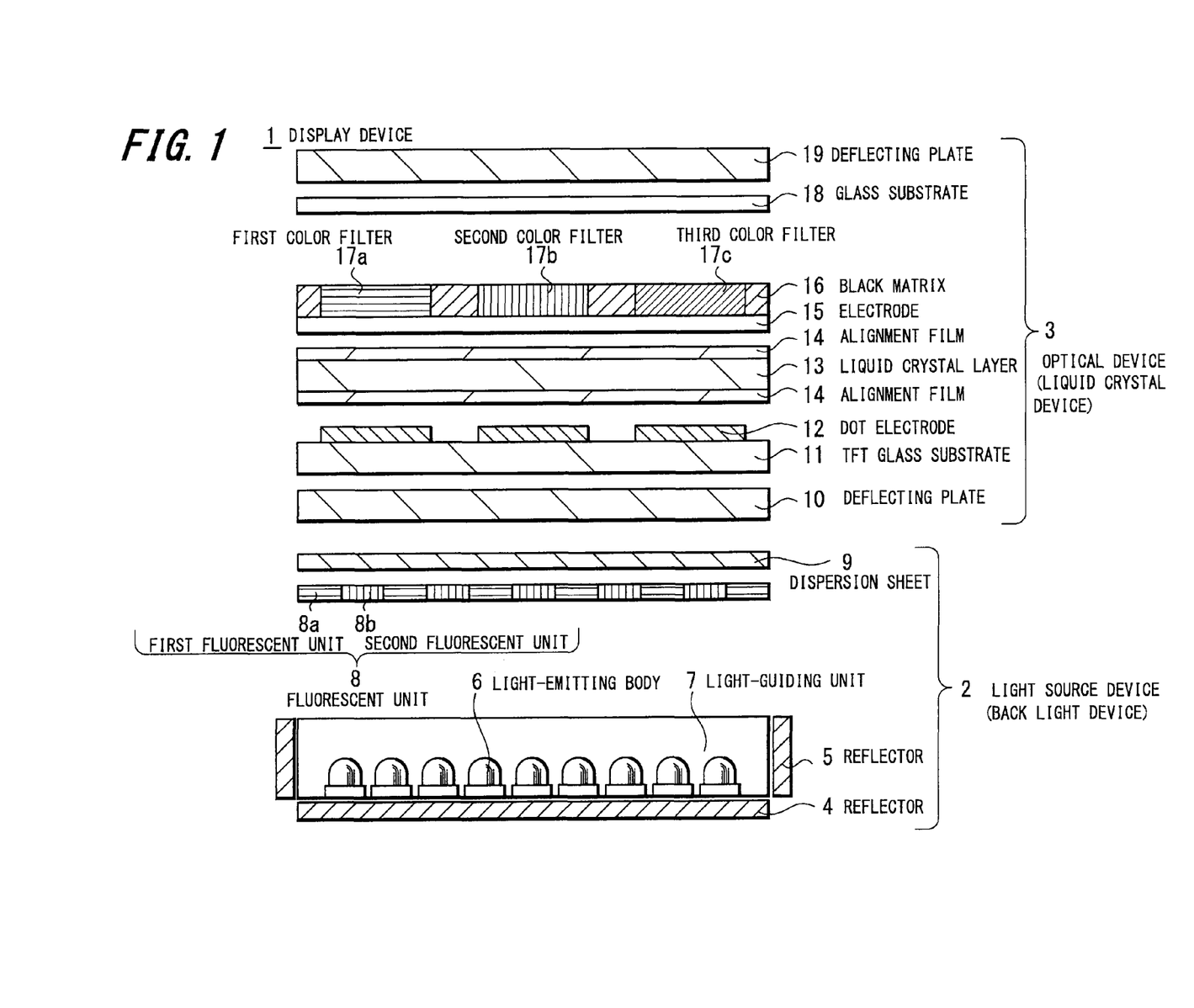
FIG. 1 is a schematic configuration diagram illustrating an exemplary configuration of a display device according to the present invention.

FIG. 1 illustrates a schematic configuration diagram of a display device having a light source device according to the present embodiment.

A display device 1 according to the present embodiment includes a light source device 2 and an optical device 3.

The light source device 2 according to the present embodiment is a back light device for the light source device 3 having a liquid crystal device. In the present embodiment, the display device 1 is the one of a direct illumination type.

Inside of a resin-made light guiding unit 7 of the light source device 2, provided are a plurality of light-emitting bodies 6 each composed of a blue LED, serving as a blue light source. The shape of the light-emitting body 6 may be appropriately selected among from various types, such as a side emitter type, a cannonball type, etc., if the light-emitting body 6 is the LED.

In a fluorescent unit 8, the above-described fluorescent bodies are arranged in a dispersed manner in a medium composed of resin.

Here, the medium in which fluorescents are dispersed may be resin directly formed around the blue light-emitting LED (a part of the white LED), or those located distant from the blue light source such as a light guiding plate, a reflective sheet, an optical film, etc. as long as they are the medium in which fluorescents are dispersed.

In the present embodiment, the fluorescent unit 8 is composed of a first fluorescent unit 8a of a first light-emitting composition including a first fluorescent body and a second fluorescent unit 8b composed of a second light-emitting composition including a second fluorescent body, having emission wavelength bands different from each other.

Further, the first fluorescent body composing the first fluorescent unit 8a is a fluorescent body having the composition shown by the above-described Chemical Formula 1 serving as the green fluorescent body. Note that to obtain emission in a green gamut, it is desirable that the emission wavelength band of the first fluorescent body includes at least a part of 510 nm to 550 nm.

The second fluorescent body composing the second fluorescent unit 8b is a fluorescent body having the composition shown by the above-described Chemical Formula 2 serving as the red fluorescent body. Note that to obtain emission in a red gamut, it is desirable that the emission wavelength band of the second fluorescent body includes at least a part of 610 nm to 670 nm.

The light-emitting body 6, the first fluorescent unit 8a, and the second fluorescent unit 8b form a so-called white LED.

Also, in the most neighboring portion opposing the optical device 3 of the light source device 2, a diffusion sheet 9 is provided. The diffusion sheet 9 guides the light from the blue light source and respective fluorescent bodies toward the side of the optical device 3 uniformly in a planar state. A reflector 4 is provided on the rear surface side of the light source device 2. Also, as necessary, a reflector 5 similar to the reflector 4 is provided to the side surface of the light guiding unit 7. As resin, besides epoxy, silicone, and urethane, various types of transparent resin may be used.

Figure 2:
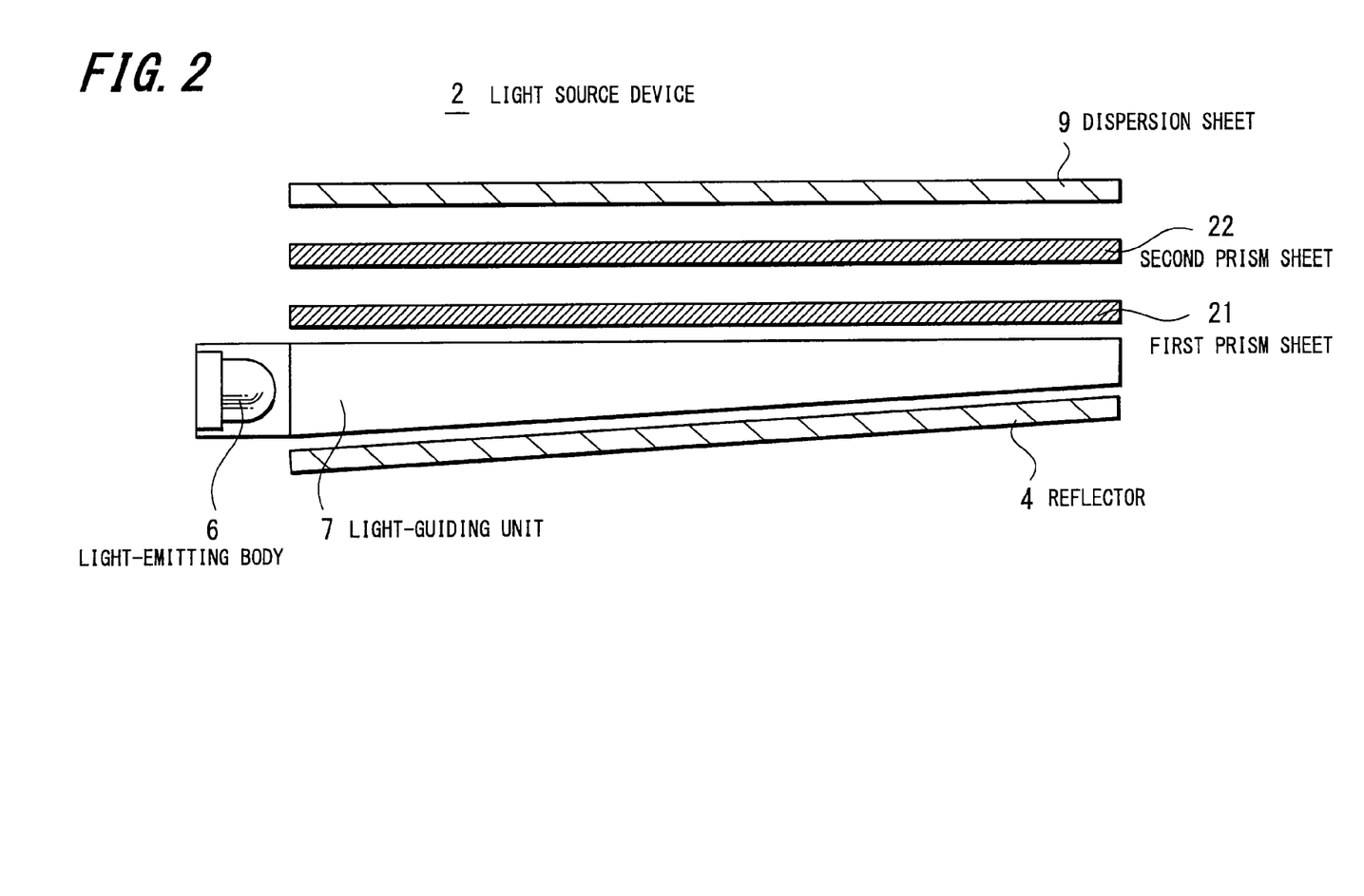
FIG. 2 is a schematic configuration diagram illustrating an example of a light source device of an exemplary display device according to the present invention.

Note that the light source device 2 may be configured, as illustrated in FIG. 2, in a system in which the light-emitting body 6 is arranged along the side surface of the light guiding unit 7. That is, the light source device 2 may be configured in a so-called edge light (side light) system, in which the light from the light emitting-body 6 is reflected by the rear side inclined face of the light guiding unit 7, and reaches the dispersion sheet 9 through a first prism sheet 21 and a second prism sheet 22. In this configuration, although not illustrated, the fluorescent unit 8 is provided either between the light-emitting emitting body 6 and the light guiding unit 7, between the light guiding unit 7 and the reflectors 4,5, or between the light guiding unit 7 and the first prism sheet 21.

Meanwhile, in the present embodiment, the optical device 3 is a liquid crystal device that outputs a predetermined output light by modulating the light from the light source device 2.

In this optical device 3, from the side close to the light source device 2, arranged are a deflecting plate 10, a glass substrate 11 for a TFT (thin film transistor), dot-like electrodes 12 on the surface of the glass substrate 11, a liquid crystal layer 13 and alignment films 14 deposited on two sides thereof, an electrode 15, a plurality of black matrixes 16 on the electrode 15, a first (red) color filter 17a, a second (green) color filter 17b and a third (blue) color filter 17c that correspond to pixels provided between the black matrixes 16, a glass substrate 18 provided distantly from the black matrixes 16 and the color filters 17a, 17b, 17c, and a deflecting plate 19 are arranged in this order.

Here, the deflecting plates 10 and 19 form the light that vibrates in a specific direction. The TFT glass substrate 11, the dot electrodes 12, and the electrode 15 are provided for switching the liquid crystal layer 13 that allows only the light vibrating in a specific direction to pass through, and due to the additional provision of the alignment films 14, the liquid crystal molecular tilts in the liquid crystal layer 13 are aligned in a fixed direction. Also, because the black matrixes 16 are provided, the contrast of light that is output from the color filters 17a-17c corresponding to respective colors is improved. These black matrixes 16 and color filters 17a, 17b, 17c are attached to the glass substrate 18.

And, in the display device 1 and the light source device 2 according to the present embodiment, particularly superior red color expression, for example, red color expression of the sRGB standard becomes possible.

Next, description will be made with respect to a result of a study carried out by simulation on a more concrete configuration of the above-described display device.

In the present study, the device configuration for enabling expression of a particularly superior red color (for example, the red color of the sRGB standard) has been more closely studied.

In the present study, as the element for obtaining a particularly superior red color, of the members constituting a display device, attention has been focused on the relationship among the emission spectrum of a green fluorescent body, the emission spectrum of a red fluorescent body, and the transmission spectrum of a red color filter. Also, subtle changes of the spectrum that are caused by changes of the value of "a" in the composition of Chemical Formula 1 and changes of the density of Eu in the composition of Chemical Formula 2 are considered. Further, because the color balance of light that passes through each color filter changes depending on the emission intensity ratio between red color and green color (the ratio of the emission intensity of the red fluorescent body to the emission intensity of the green fluorescent body: hereinafter the ratio is called P), this point has been also studied.

Note that in the following simulation, values of respective parameters and their intervals are not necessarily continuous or constant, however, these values and intervals are defined in a range that can be said as sufficiently fine in grasping the trend of the optical characteristics in a display device, and it is believed that in the vicinity of each value, substantially the same trend as that of the value will be shown.

Further, in the following simulation, in the case of a display device of a liquid crystal display type for example, because the basic color information can be obtained by (emission spectrum of a fluorescent body)×(transmission spectrum of a color filter), chromaticity calculation is carried out using a method of multiplying this color information by a color matching function.

Specifically, a white emission spectrum of a white LED including a green fluorescent body and a red fluorescent body is multiplied by a transmission spectrum of a red color filter, and further, chromaticity points are obtained by calculation from the color matching function. The matching color function is a value obtained by experiment on how much stimuli of red, green, and blue are felt for each wavelength of light. The color matching function is composed of three functions, an $x(\lambda)$ function, a $y(\lambda)$ function, and a $z(\lambda)$ function. The $x(\lambda)$ function expresses the degree that redness of each wavelength is felt, and similarly, the $y(\lambda)$ and $z(\lambda)$ functions express the degrees that a tincture of blue and a tincture of green for each wavelength are felt. Concrete calculation formulae are shown in Mathematical Formula 1 through Mathematical formula 5.

$X = k \int vis \phi(\lambda) \cdot x0(\lambda) d\lambda$ [Mathematical Formula 1]

$Y = k \int vis \phi(\lambda) \cdot y0(\lambda) d\lambda$ [Mathematical Formula 2]

$Z = k \int vis \phi(\lambda) \cdot z0(\lambda) d\lambda$ [Mathematical Formula 3]

$x = X/(Y+Y+Z)$ [Mathematical Formula 4]

$y = Y/(X+Y+Z)$ [Mathematical Formula 5]

Using this method, with respect to red color and green color, chromaticity points $(x_R, y_R)$ and $(x_G, y_G)$ were calculated. Then, device configurations have been studied that allow the red chromaticity point $(x_R, y_R)$ with respect to emission of a red fluorescent body in a chromaticity coordinate to satisfy $x_R \geq 0.640$ and $y_R \leq 0.330$.

Here, description is made with respect to the members configuring a display device, and the influence on color expression the characteristics (elements) of each member have.

Figure 3:
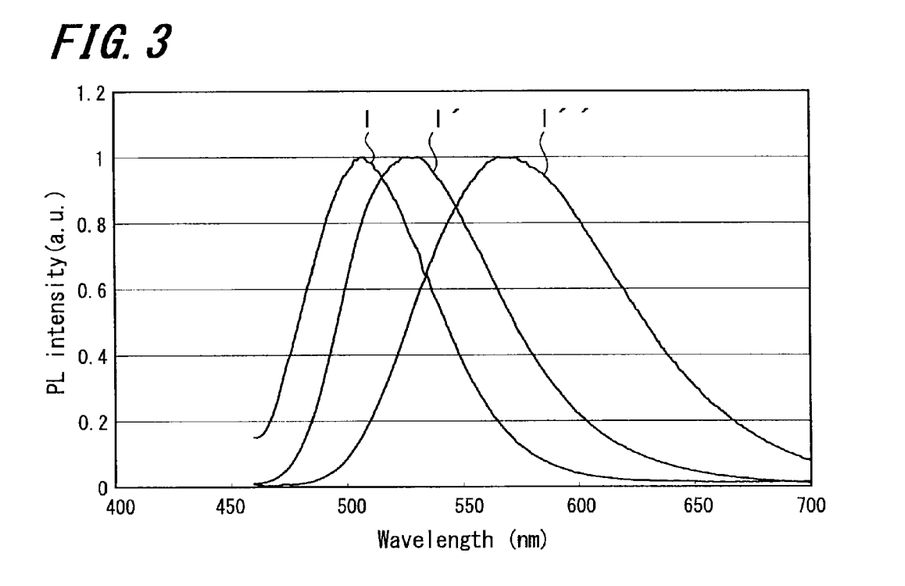
FIG. 3 is a diagram showing another example of an emission spectrum of a fluorescent body, for explaining an exemplary display device according to the present invention.
Figure 4:
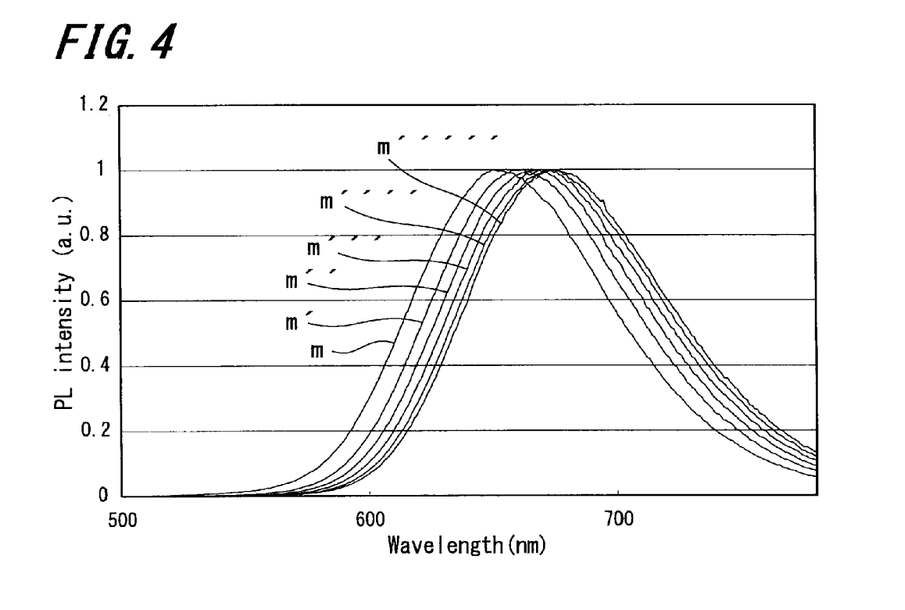
FIG. 4 is a diagram showing another example of an emission spectrum of a fluorescent body, for explaining an exemplary display device according to the present invention.

First, an emission spectrum of a fluorescent body having the composition shown by Chemical Formula 1 and an emission spectrum of a fluorescent body having the composition shown by Chemical Formula 2 are shown in FIG. 3 and FIG. 4, respectively. It is understood that the position of the emission spectrum of the fluorescent body having the composition shown by Chemical Formula 1 shifts toward the long wavelength side as the value of "a" increases (in figure, 1 to 1"). On the other hand, it is understood that the position of the emission spectrum of the fluorescent body having the composition shown by Chemical Formula 2 shifts to the long wavelength side as the density of Eu increases (in figure, m to m''''). Note that with respect to the fluorescent body having the composition shown by Chemical Formula 1, the one in which the density of Eu is 1 mol % to 10 mol % has been made on trial, and the emission spectrum has been measured, however, it has been confirmed that the influence of the value of "a" is overwhelmingly greater, so that in the simulation, only the study on changing the value of "a" has been carried out rather than the study on changing the density of Eu.

Figure 5:
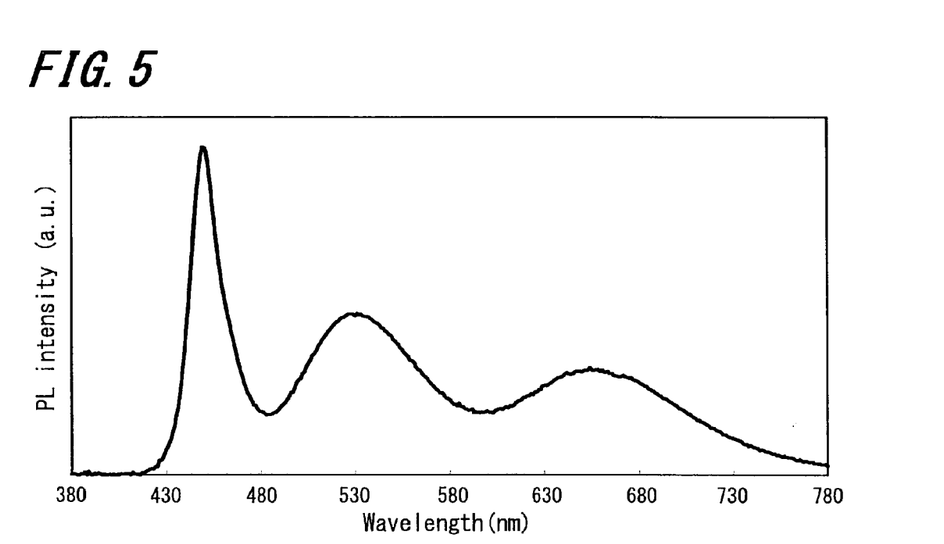
FIG. 5 is a diagram showing another example of an emission spectrum of a fluorescent body, for explaining an exemplary display device according to the present invention.

Also, the red color that is finally output from a display device is obtained by combining the emission spectrum of the green fluorescent body that comes to be mixed in the range of the transmission spectrum of the red color filter and the emission spectrum of the red fluorescent body (an example is shown in FIG. 5). That is, the red color that is finally output from a display device is influenced by the emission spectrum of the green fluorescent body also. In the simulation, the ratio of the emission intensity of the emission spectrum of red color to the emission spectrum of green color is used as a parameter, and study has been made on this emission intensity ratio P. P has been changed in the range of 0.6-1.5, and in a stage that the spectrum shapes corresponding to theses values have been obtained, calculation has been performed.

Figure 6:
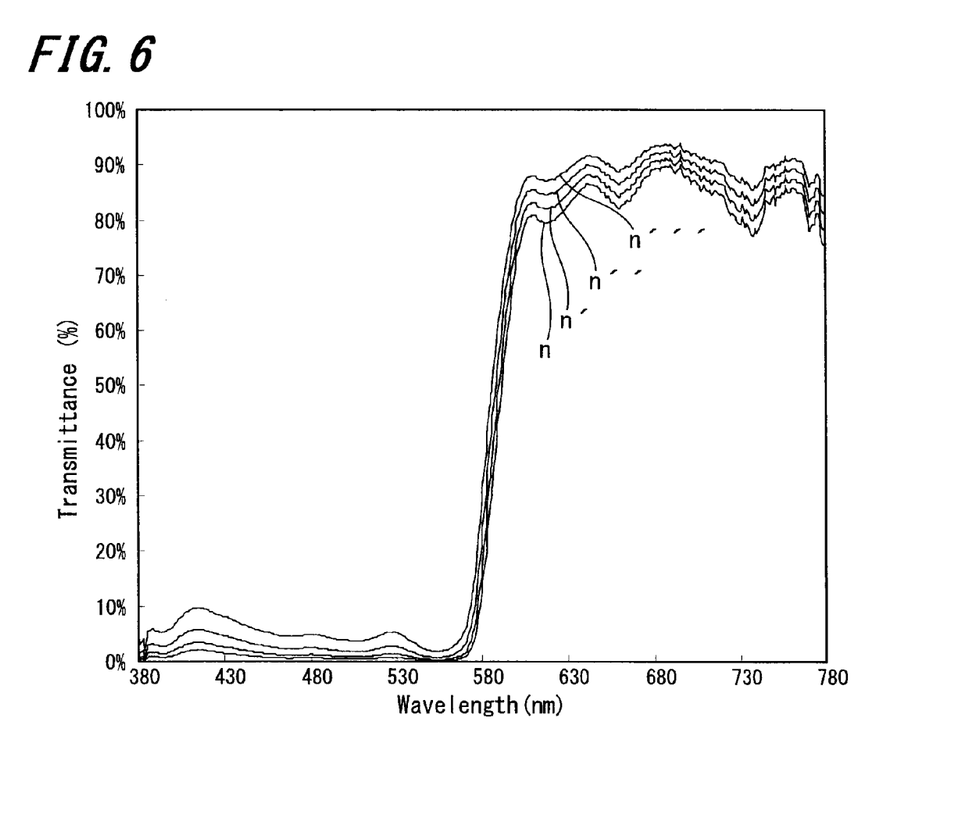
FIG. 6 is a diagram showing another example of a transmission spectrum of a color filter, for explaining an exemplary display device according to the present invention.

Further, the transmission spectrum of the red color filter also has influence on the color gamut of red light that is finally outputted. As the transmission spectrum of the red color filter is shown in FIG. 6, as the film thickness of the filter becomes greater, the transmittance becomes smaller (n to n'").

Herein below, detailed description is made with respect to a result of study carried out using these elements as parameters.

First, as a first device configuration example, simulation has been carried out with respect to a display device in a numerical range that the transmittance of the red color filter is 30% or above and lower than 33% with respect to the wavelength of 580 nm and 91% or above and lower than 94% with respect to the wavelength of 650 nm. Note that in the simulation, the transmittances at the wavelengths of 580 nm and 650 nm have been selected as 30% and 91%, respectively, however, similar characteristics have been confirmed in the above-described numerical range.

The result is shown in Table 1 through Table 12. Here, The Eu densities of the red fluorescent body having the composition shown by Chemical Formula 2 are 1 mol %, 3 mol %, and 6 mol %, respectively, in Table 1 through Table 4, Table 5 through Table 8, and Table 9 through Table 12.

TABLE 1

| | P | | | | |
|---|---|---|---|---|---|
| a = 0 | 0.6 | 0.8 | 1.0 | 1.2 | 1.5 |
| x | 0.619 | 0.633 | 0.642 | 0.648 | 0.655 |
| y | 0.348 | 0.341 | 0.336 | 0.333 | 0.330 |

TABLE 2

| | P | | | | |
|---|---|---|---|---|---|
| a = 1 | 0.6 | 0.8 | 1.0 | 1.2 | 1.5 |
| x | 0.631 | 0.640 | 0.647 | 0.652 | 0.658 |
| y | 0.361 | 0.353 | 0.347 | 0.343 | 0.338 |

TABLE 3

| | P | | | | |
|---|---|---|---|---|---|
| a = 1.5 | 0.6 | 0.8 | 1.0 | 1.2 | 1.5 |
| x | 0.631 | 0.637 | 0.642 | 0.645 | 0.650 |
| y | 0.364 | 0.359 | 0.355 | 0.351 | 0.348 |

TABLE 4

| | P | | | | |
|---|---|---|---|---|---|
| a = 2 | 0.6 | 0.8 | 1.0 | 1.2 | 1.5 |
| x | 0.631 | 0.634 | 0.636 | 0.639 | 0.642 |
| y | 0.368 | 0.365 | 0.362 | 0.360 | 0.357 |

TABLE 5

| | P | | | | |
|---|---|---|---|---|---|
| a = 0 | 0.6 | 0.8 | 1.0 | 1.2 | 1.5 |
| x | 0.612 | 0.629 | 0.640 | 0.648 | 0.656 |
| y | 0.348 | 0.339 | 0.333 | 0.329 | 0.324 |

TABLE 6

| | P | | | | |
|---|---|---|---|---|---|
| a = 1 | 0.6 | 0.8 | 1.0 | 1.2 | 1.5 |
| x | 0.627 | 0.638 | 0.646 | 0.652 | 0.659 |
| y | 0.363 | 0.354 | 0.347 | 0.341 | 0.336 |

TABLE 7

| | P | | | | |
|---|---|---|---|---|---|
| a = 1.5 | 0.6 | 0.8 | 1.0 | 1.2 | 1.5 |
| x | 0.629 | 0.636 | 0.641 | 0.645 | 0.650 |
| y | 0.366 | 0.360 | 0.355 | 0.351 | 0.347 |

TABLE 8

| | P | | | | |
|---|---|---|---|---|---|
| a = 2 | 0.6 | 0.8 | 1.0 | 1.2 | 1.5 |
| x | 0.630 | 0.633 | 0.635 | 0.638 | 0.641 |
| y | 0.368 | 0.366 | 0.363 | 0.361 | 0.358 |

TABLE 9

| | P | | | | |
|---|---|---|---|---|---|
| a = 0 | 0.6 | 0.8 | 1.0 | 1.2 | 1.5 |
| x | 0.605 | 0.624 | 0.636 | 0.646 | 0.656 |
| y | 0.349 | 0.339 | 0.332 | 0.327 | 0.322 |

TABLE 10

| | P | | | | |
|---|---|---|---|---|---|
| a = 1 | 0.6 | 0.8 | 1.0 | 1.2 | 1.5 |
| x | 0.623 | 0.635 | 0.644 | 0.651 | 0.659 |
| y | 0.366 | 0.356 | 0.348 | 0.342 | 0.335 |

TABLE 11

| | P | | | | |
|---|---|---|---|---|---|
| a = 1.5 | 0.6 | 0.8 | 1.0 | 1.2 | 1.5 |
| x | 0.626 | 0.634 | 0.639 | 0.644 | 0.650 |
| y | 0.368 | 0.361 | 0.356 | 0.352 | 0.347 |

TABLE 12

|       |       |       | P     |       |       |
|-------|-------|-------|-------|-------|-------|
| a = 2 | 0.6   | 0.8   | 1.0   | 1.2   | 1.5   |
| x     | 0.629 | 0.632 | 0.635 | 0.637 | 0.640 |
| y     | 0.369 | 0.367 | 0.364 | 0.362 | 0.359 |

From these results, in the first device configuration example, it has been confirmed that only when a=0 and the ratio (P) of the emission intensity of the red fluorescent body relative to the emission intensity of the green fluorescent body is greater than 1.0, a particularly superior red color (in the present embodiment, the red color chromaticity point of sRGB) can be obtained.

More concretely, it has been confirmed that out of the configurations that P is greater than 1.0 and 1.5 or below, the value of "a" in Chemical Formula 1 is $0 \leq a < 1$, and the density of Eu in Chemical Formula 2 is 1.0 mol % or above and 6.0 mol % or below, a particularly superior red color can be expressed in the device configurations excluding a combination that the density of Eu composing the red fluorescent body is 1.0 mol %, the ratio of the emission intensity of the red fluorescent body relative to the emission intensity of the green fluorescent body is smaller than 1.5, and a=0.

Figure 7:
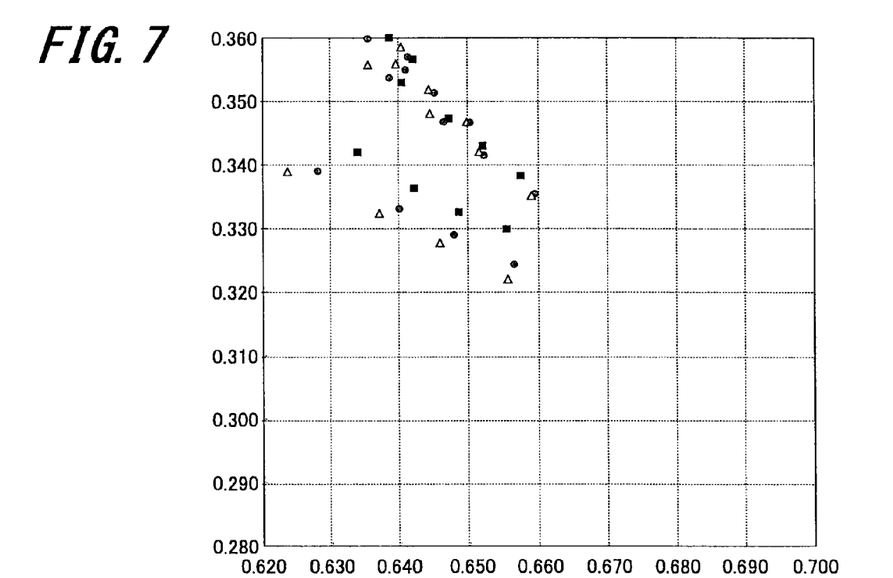
FIG. 7 is an explanatory diagram for explaining a chromaticity point, in a concrete example of a display device according to the present invention.

These results in Table 1 through Table 12 are organized on a chromaticity coordinate and are shown in FIG. 7.

Note that in FIG. 7, only the range of $0.620 \leq x \leq 0.700$ and $0.280 \leq y \leq 0.360$ is illustrated. Also, in FIG. 7, ■ corresponds to the results in Table 1 through Table 4, ⊚ corresponds to the results in Table 5 through table 8, and Δ corresponds to the results in Table 9 through Table 12, respectively.

Next, as a second device configuration example, simulation has been carried out with respect to a display device in the numerical range that the transmittance of the red color filter is higher than 17% and lower than 30% with respect to the wavelength of 580 nm and higher than 87% and lower than 91% with respect to the wavelength of 650 nm. Note that in the simulation, the transmittances at the wavelengths of 580 nm and 650 nm have been selected as 23% and 89%, respectively, however, similar characteristics have been confirmed in the above-described numerical range.

The results are shown in Table 13 through Table 24. Here, the Eu densities of the red fluorescent body having the composition shown by Chemical Formula 2 are 1 mol %, 3 mol %, and 6 mol %, respectively, in Table 13 through Table 16, Table 17 through Table 20, and Table 21 through Table 24.

TABLE 13

|       |       |       | P     |       |       |
|-------|-------|-------|-------|-------|-------|
| a = 0 | 0.6   | 0.8   | 1.0   | 1.2   | 1.5   |
| x     | 0.619 | 0.633 | 0.642 | 0.648 | 0.655 |
| y     | 0.348 | 0.341 | 0.336 | 0.333 | 0.330 |

TABLE 14

|       |       |       | P     |       |       |
|-------|-------|-------|-------|-------|-------|
| a = 1 | 0.6   | 0.8   | 1.0   | 1.2   | 1.5   |
| x     | 0.649 | 0.656 | 0.661 | 0.664 | 0.668 |
| y     | 0.346 | 0.340 | 0.336 | 0.333 | 0.329 |

TABLE 15

|         |       |       | P     |       |       |
|---------|-------|-------|-------|-------|-------|
| a = 1.5 | 0.6   | 0.8   | 1.0   | 1.2   | 1.5   |
| x       | 0.645 | 0.650 | 0.653 | 0.656 | 0.659 |
| y       | 0.353 | 0.348 | 0.345 | 0.342 | 0.339 |

TABLE 16

|       |       |       | P     |       |       |
|-------|-------|-------|-------|-------|-------|
| a = 2 | 0.6   | 0.8   | 1.0   | 1.2   | 1.5   |
| x     | 0.640 | 0.643 | 0.645 | 0.647 | 0.650 |
| y     | 0.359 | 0.356 | 0.354 | 0.352 | 0.349 |

TABLE 17

|       |       |       | P     |       |       |
|-------|-------|-------|-------|-------|-------|
| a = 0 | 0.6   | 0.8   | 1.0   | 1.2   | 1.5   |
| x     | 0.646 | 0.657 | 0.664 | 0.669 | 0.674 |
| y     | 0.331 | 0.325 | 0.321 | 0.319 | 0.316 |

TABLE 18

|       |       |       | P     |       |       |
|-------|-------|-------|-------|-------|-------|
| a = 1 | 0.6   | 0.8   | 1.0   | 1.2   | 1.5   |
| x     | 0.648 | 0.657 | 0.663 | 0.667 | 0.672 |
| y     | 0.346 | 0.339 | 0.334 | 0.330 | 0.325 |

TABLE 19

|         |       |       | P     |       |       |
|---------|-------|-------|-------|-------|-------|
| a = 1.5 | 0.6   | 0.8   | 1.0   | 1.2   | 1.5   |
| x       | 0.644 | 0.650 | 0.654 | 0.657 | 0.661 |
| y       | 0.353 | 0.348 | 0.344 | 0.341 | 0.337 |

TABLE 20

|       |       |       | P     |       |       |
|-------|-------|-------|-------|-------|-------|
| a = 2 | 0.6   | 0.8   | 1.0   | 1.2   | 1.5   |
| x     | 0.640 | 0.642 | 0.645 | 0.647 | 0.650 |
| y     | 0.359 | 0.357 | 0.354 | 0.352 | 0.349 |

TABLE 21

| a = 0 | P | | | | |
|---|---|---|---|---|---|
| | 0.6 | 0.8 | 1.0 | 1.2 | 1.5 |
| x | 0.644 | 0.656 | 0.664 | 0.670 | 0.676 |
| y | 0.331 | 0.323 | 0.319 | 0.315 | 0.312 |

TABLE 22

| a = 1 | P | | | | |
|---|---|---|---|---|---|
| | 0.6 | 0.8 | 1.0 | 1.2 | 1.5 |
| x | 0.647 | 0.656 | 0.663 | 0.668 | 0.673 |
| y | 0.347 | 0.339 | 0.333 | 0.328 | 0.323 |

TABLE 23

| a = 1.5 | P | | | | |
|---|---|---|---|---|---|
| | 0.6 | 0.8 | 1.0 | 1.2 | 1.5 |
| x | 0.643 | 0.649 | 0.653 | 0.657 | 0.661 |
| y | 0.354 | 0.348 | 0.344 | 0.341 | 0.337 |

TABLE 24

| a = 2 | P | | | | |
|---|---|---|---|---|---|
| | 0.6 | 0.8 | 1.0 | 1.2 | 1.5 |
| x | 0.639 | 0.642 | 0.644 | 0.646 | 0.649 |
| y | 0.360 | 0.357 | 0.355 | 0.353 | 0.350 |

From these results, in the second configuration example, it was possible to confirm two systems of preferable device configurations.

First, it has been confirmed that out of the configurations that P is greater than 0.6 and 1.5 or below, the value of "a" in Chemical Formula 1 is $0 \leq a < 1$, and the density of Eu in Chemical Formula 2 is 1.0 mol % or above and 6.0 mol % or below, a particularly superior red color can be expressed in the device configurations excluding a combination that the density of Eu composing the red fluorescent body is 1.0 mol %, the ratio of the emission intensity of the red fluorescent body relative to the emission intensity of the green fluorescent body is 0.6 or above and 1.2 or below, and a=0 (the shaded portions in Table 17 and Table 21).

Further, it has been confirmed that out of the configurations that P is greater than 1.0 and lower than 1.5, the value of "a" in Chemical Formula 1 is $1 \leq a < 1.5$, and the density of Eu in Chemical Formula 2 is 1.0 mol % or above and 6.0 mol % or below, a particularly superior red color can be expressed in the device configurations excluding a combination that the density of Eu composing the red fluorescent body is 1.0 mol %, the ratio of the emission intensity of the red fluorescent body relative to the emission intensity of the green fluorescent body is greater than 1.0 and 1.2 or below, and a=1 (the shaded portions corresponding to P=1.2 in Table 18 and Table 22).

Also, it has been confirmed that a particularly superior red color can be expressed in the configurations that P is greater than 1.0 and 1.5 or below, the value of "a" in Chemical Formula 1 is $0 \leq a < 1.5$, and the density of Eu in Chemical Formula 2 is 1.0 mol % or above and 6.0 mol % or below (the shaded portions corresponding to P=1.5 in Table 13, Table 14, Table 17, Table 18, Table 21, and Table 22).

Figure 8:
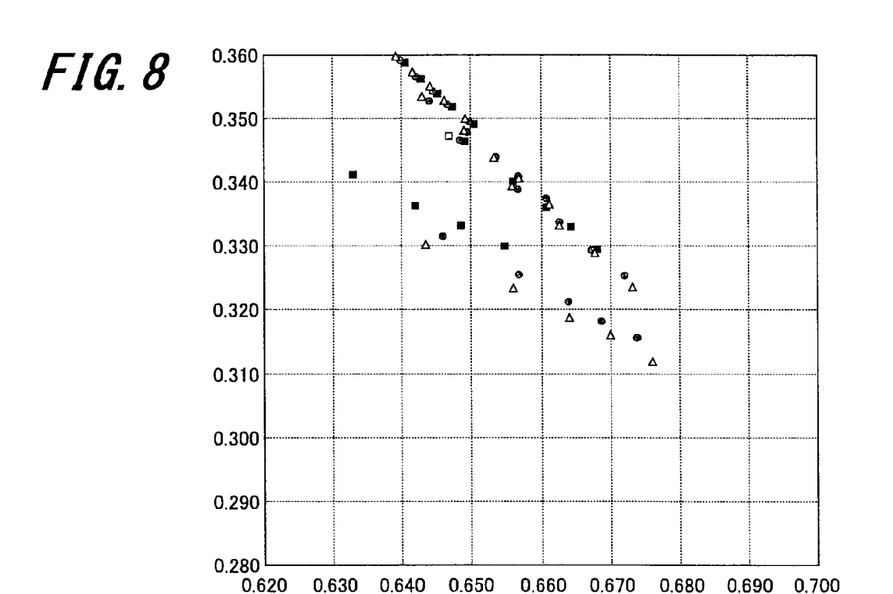
FIG. 8 is an explanatory diagram for explaining a chromaticity point, in a concrete example of a display device according to the present invention.

These results of Table 13 through Table 24 are organized on a chromaticity coordinate and are shown in FIG. 8.

Note that in FIG. 8, only the range of $0.620 \leq x \leq 0.700$ and $0.280 \leq y \leq 0.360$ is illustrated. Also, in FIG. 8, ■ corresponds to the results in Table 13 through Table 16, ⊚ corresponds to the results in Table 17 through table 20, and Δ corresponds to the results in Table 21 through Table 22, respectively.

Next, as a third device configuration example, simulation has been carried out with respect to a display device in the numerical range such that the transmittance of the red color filter is higher than 13% and lower than 23% with respect to the wavelength of 580 nm and higher than 85% and lower than 89% with respect to the wavelength of 650 nm. Note that in the simulation, the transmittances at the wavelengths of 580 nm and 650 nm have been selected as 17% and 87%, respectively, however, similar characteristics have been confirmed in the above-described numerical range.

The results are shown in Table 25 through Table 36. Here, the Eu densities of the red fluorescent body having the composition shown by Chemical Formula 2 are 1 mol %, 3 mol %, and 6 mol %, respectively in Table 25 through Table 28, Table 29 through Table 32, and Table 33 through Table 36.

TABLE 25

| a = 0 | P | | | | |
|---|---|---|---|---|---|
| | 0.6 | 0.8 | 1.0 | 1.2 | 1.5 |
| x | 0.664 | 0.669 | 0.673 | 0.675 | 0.678 |
| y | 0.326 | 0.323 | 0.321 | 0.320 | 0.318 |

TABLE 26

| a = 1 | P | | | | |
|---|---|---|---|---|---|
| | 0.6 | 0.8 | 1.0 | 1.2 | 1.5 |
| x | 0.659 | 0.669 | 0.668 | 0.670 | 0.673 |
| y | 0.339 | 0.334 | 0.330 | 0.328 | 0.325 |

TABLE 27

| a = 1.5 | P | | | | |
|---|---|---|---|---|---|
| | 0.6 | 0.8 | 1.0 | 1.2 | 1.5 |
| x | 0.653 | 0.657 | 0.659 | 0.662 | 0.664 |
| y | 0.346 | 0.342 | 0.339 | 0.337 | 0.335 |

TABLE 28

| a = 2 | P | | | | |
|---|---|---|---|---|---|
| | 0.6 | 0.8 | 1.0 | 1.2 | 1.5 |
| x | 0.647 | 0.649 | 0.651 | 0.653 | 0.656 |
| y | 0.353 | 0.350 | 0.348 | 0.346 | 0.344 |

TABLE 29

| a = 0 | P | | | | |
|---|---|---|---|---|---|
| | 0.6 | 0.8 | 1.0 | 1.2 | 1.5 |
| x | 0.666 | 0.673 | 0.678 | 0.681 | 0.684 |
| y | 0.322 | 0.317 | 0.315 | 0.313 | 0.311 |

TABLE 30

| a = 1 | P | | | | |
|---|---|---|---|---|---|
| | 0.6 | 0.8 | 1.0 | 1.2 | 1.5 |
| x | 0.660 | 0.666 | 0.671 | 0.674 | 0.678 |
| y | 0.337 | 0.330 | 0.327 | 0.324 | 0.320 |

TABLE 31

| a = 1.5 | P | | | | |
|---|---|---|---|---|---|
| | 0.6 | 0.8 | 1.0 | 1.2 | 1.5 |
| x | 0.653 | 0.657 | 0.661 | 0.664 | 0.667 |
| y | 0.345 | 0.341 | 0.338 | 0.335 | 0.332 |

TABLE 32

| a = 2 | P | | | | |
|---|---|---|---|---|---|
| | 0.6 | 0.8 | 1.0 | 1.2 | 1.5 |
| x | 0.646 | 0.649 | 0.651 | 0.653 | 0.656 |
| y | 0.353 | 0.351 | 0.349 | 0.347 | 0.344 |

TABLE 33

| a = 0 | P | | | | |
|---|---|---|---|---|---|
| | 0.6 | 0.8 | 1.0 | 1.2 | 1.5 |
| x | 0.667 | 0.675 | 0.680 | 0.684 | 0.688 |
| y | 0.319 | 0.314 | 0.311 | 0.308 | 0.306 |

TABLE 34

| a = 1 | P | | | | |
|---|---|---|---|---|---|
| | 0.6 | 0.8 | 1.0 | 1.2 | 1.5 |
| x | 0.661 | 0.668 | 0.674 | 0.678 | 0.682 |
| y | 0.336 | 0.329 | 0.324 | 0.320 | 0.316 |

TABLE 35

| a = 1.5 | P | | | | |
|---|---|---|---|---|---|
| | 0.6 | 0.8 | 1.0 | 1.2 | 1.5 |
| x | 0.654 | 0.658 | 0.662 | 0.665 | 0.669 |
| y | 0.345 | 0.340 | 0.336 | 0.334 | 0.330 |

TABLE 36

| a = 2 | P | | | | |
|---|---|---|---|---|---|
| | 0.6 | 0.8 | 1.0 | 1.2 | 1.5 |
| x | 0.646 | 0.648 | 0.650 | 0.652 | 0.655 |
| y | 0.353 | 0.351 | 0.349 | 0.347 | 0.344 |

From these results, in the third device configuration example, it was possible to confirm two systems of preferable device configurations.

First, it has been confirmed that out of the configurations that P is greater than 0.6 and 1.5 or below, the value of "a" in Chemical Formula 1 is $1 \leq a < 1.5$, and the density of Eu in Chemical Formula 2 is 1.0 mol % or above and 6.0 mol % or below, a particularly superior red color can be expressed in the device configurations excluding a combination that the density of Eu composing the red fluorescent body is 1.0 mol %, the ratio of the emission intensity of the red fluorescent body relative to the emission intensity of the green fluorescent body is greater than and 0.8 or below, and a=1 (the shaded portions in Table 26, Table 30, and Table 34).

Also, it has been confirmed that a particularly superior red color can be expressed in the configurations that P is 0.6 or above and 1.5 or below, the value of "a" in Chemical Formula 1 is $0 \leq a < 1$, and the density of Eu in Chemical Formula 2 is 1.0 mol % or above and 6.0 mol % or below (the shaded portions in Table 25, Table 29, and Table 33).

Also, it has been confirmed that a particularly superior red color can be expressed also in the configurations that P is greater than 1.2 and 1.5 or below, the value of "a" in Chemical Formula 1 is $1.5 \leq a < 2.0$, and the density of Eu in Chemical Formula 2 is higher than 3.0 mol % and 6.0 mol % or below (the shaded portion corresponding to P=1.5 in Table 35).

Figure 9:
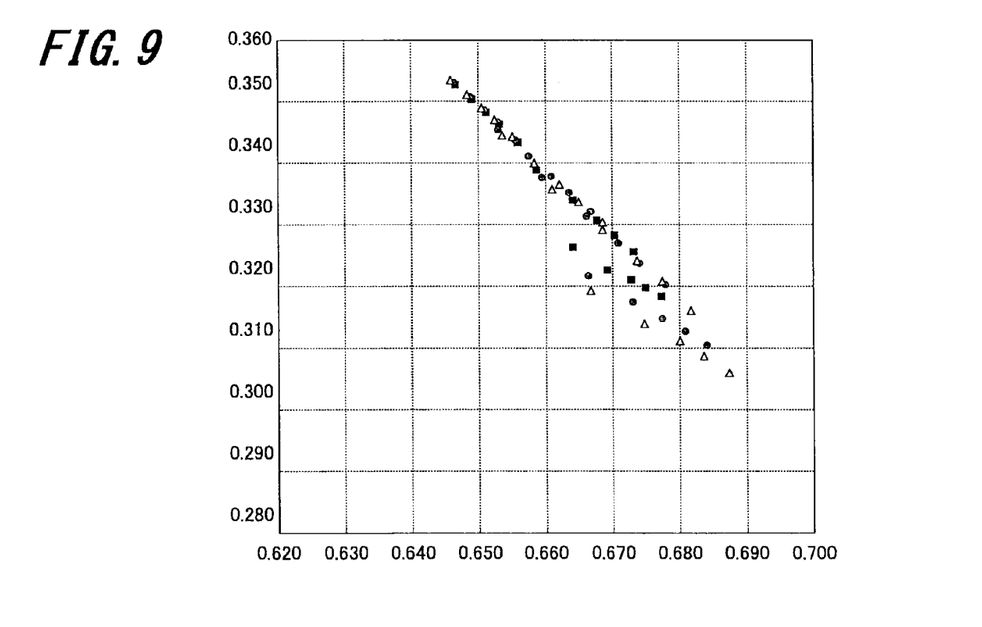
FIG. 9 is an explanatory diagram for explaining a chromaticity point, in a concrete example of a display device according to the present invention.

These results of Table 25 through Table 36 are organized on a chromaticity coordinate and are shown in FIG. 9.

Note that in FIG. 9, only the range of $0.620 \leq x \leq 0.700$ and $0.280 \leq y \leq 0.360$ is illustrated. Also, in FIG. 9, ■ corresponds to the results in Table 25 through Table 28, ⊙ corresponds to the results in Table 29 through Table 32, and Δ corresponds to the results in Table 33 through Table 36, respectively.

Next, as a fourth device configuration example, simulation has been carried out with respect to a display device in the numerical range that the transmittance of the red color filter is 9% or above and lower than 13% with respect to the wavelength of 580 nm and 81% or above and 85% or below with respect to the wavelength of 650 nm. Note that in the simulation, the transmittances at the wavelengths of 580 nm and 650 nm have been selected as 13% and 85%, respectively, however, similar characteristics have been confirmed in the above-described numerical range.

The results are shown in Table 37 through Table 48. Here, the Eu densities of the red fluorescent body having the composition shown by Chemical Formula 2 are 1 mol %, 3 mol %, and 6 mol %, respectively, in Table 37 through Table 40, Table 41 through Table 44, and Table 45 through Table 48.

TABLE 37

| a = 0 | P |  |  |  |  |
|---|---|---|---|---|---|
|  | 0.6 | 0.8 | 1.0 | 1.2 | 1.5 |
| x | 0.674 | 0.677 | 0.679 | 0.681 | 0.682 |
| y | 0.321 | 0.319 | 0.317 | 0.316 | 0.315 |

TABLE 38

| a = 1 | P |  |  |  |  |
|---|---|---|---|---|---|
|  | 0.6 | 0.8 | 1.0 | 1.2 | 1.5 |
| x | 0.667 | 0.671 | 0.674 | 0.676 | 0.678 |
| y | 0.330 | 0.327 | 0.325 | 0.323 | 0.321 |

TABLE 39

| a = 1.5 | P |  |  |  |  |
|---|---|---|---|---|---|
|  | 0.6 | 0.8 | 1.0 | 1.2 | 1.5 |
| x | 0.659 | 0.662 | 0.665 | 0.667 | 0.669 |
| y | 0.339 | 0.337 | 0.334 | 0.333 | 0.330 |

TABLE 40

| a = 2 | P |  |  |  |  |
|---|---|---|---|---|---|
|  | 0.6 | 0.8 | 1.0 | 1.2 | 1.5 |
| x | 0.651 | 0.653 | 0.655 | 0.657 | 0.659 |
| y | 0.348 | 0.346 | 0.344 | 0.342 | 0.340 |

TABLE 41

| a = 0 | P |  |  |  |  |
|---|---|---|---|---|---|
|  | 0.6 | 0.8 | 1.0 | 1.2 | 1.5 |
| x | 0.678 | 0.682 | 0.685 | 0.687 | 0.690 |
| y | 0.316 | 0.312 | 0.310 | 0.309 | 0.308 |

TABLE 42

| a = 1 | P |  |  |  |  |
|---|---|---|---|---|---|
|  | 0.6 | 0.8 | 1.0 | 1.2 | 1.5 |
| x | 0.669 | 0.675 | 0.678 | 0.681 | 0.684 |
| y | 0.329 | 0.324 | 0.321 | 0.318 | 0.315 |

TABLE 43

| a = 1.5 | P |  |  |  |  |
|---|---|---|---|---|---|
|  | 0.6 | 0.8 | 1.0 | 1.2 | 1.5 |
| x | 0.660 | 0.664 | 0.667 | 0.669 | 0.672 |
| y | 0.339 | 0.335 | 0.332 | 0.330 | 0.328 |

TABLE 44

| a = 2 | P |  |  |  |  |
|---|---|---|---|---|---|
|  | 0.6 | 0.8 | 1.0 | 1.2 | 1.5 |
| x | 0.651 | 0.653 | 0.655 | 0.657 | 0.660 |
| y | 0.349 | 0.346 | 0.344 | 0.342 | 0.340 |

TABLE 45

| a = 0 | P |  |  |  |  |
|---|---|---|---|---|---|
|  | 0.6 | 0.8 | 1.0 | 1.2 | 1.5 |
| x | 0.680 | 0.685 | 0.689 | 0.691 | 0.694 |
| y | 0.312 | 0.309 | 0.306 | 0.304 | 0.303 |

TABLE 46

| a = 1 | P |  |  |  |  |
|---|---|---|---|---|---|
|  | 0.6 | 0.8 | 1.0 | 1.2 | 1.5 |
| x | 0.670 | 0.676 | 0.680 | 0.683 | 0.687 |
| y | 0.328 | 0.323 | 0.318 | 0.315 | 0.312 |

TABLE 47

| a = 1.5 | P |  |  |  |  |
|---|---|---|---|---|---|
|  | 0.6 | 0.8 | 1.0 | 1.2 | 1.5 |
| x | 0.660 | 0.664 | 0.668 | 0.670 | 0.673 |
| y | 0.339 | 0.335 | 0.332 | 0.329 | 0.326 |

TABLE 48

| a = 2 | P |  |  |  |  |
|---|---|---|---|---|---|
|  | 0.6 | 0.8 | 1.0 | 1.2 | 1.5 |
| x | 0.651 | 0.653 | 0.655 | 0.657 | 0.659 |
| y | 0.349 | 0.347 | 0.345 | 0.343 | 0.340 |

From these results, in the fourth device configuration example, it was possible to confirm two systems of preferable device configurations.

First, it has been confirmed that a particularly superior red color can be expressed in the configurations that P is 0.6 or above and 1.5 or below, the value of "a" in Chemical Formula 1 is $0 \leq a < 1.5$, and the density of Eu in Chemical Formula 2 is 1.0 mol % or above and 6.0 mol % or below (the shaded portions in Table 37, Table 38, Table 41, Table 42, Table 45, and Table 46).

Also, it has been confirmed that out of the configurations that P is greater than 1.0 and 1.5 or below, the value of "a" in Chemical Formula 1 is 1.5≦a<2.0, and the density of Eu in Chemical Formula 2 is 1.0 mol % or above and 6.0 mol % or below, a particularly superior red color can be expressed in the device configurations excluding a combination that the density of Eu composing the red fluorescent body is 1.0 mol %, the ratio of the emission intensity of the red fluorescent body relative to the emission intensity of the green fluorescent body is greater than 1 and 1.2 or below, and a=1.5 (the shaded portions in Table 39, Table 43, and Table 47).

Figure 10:
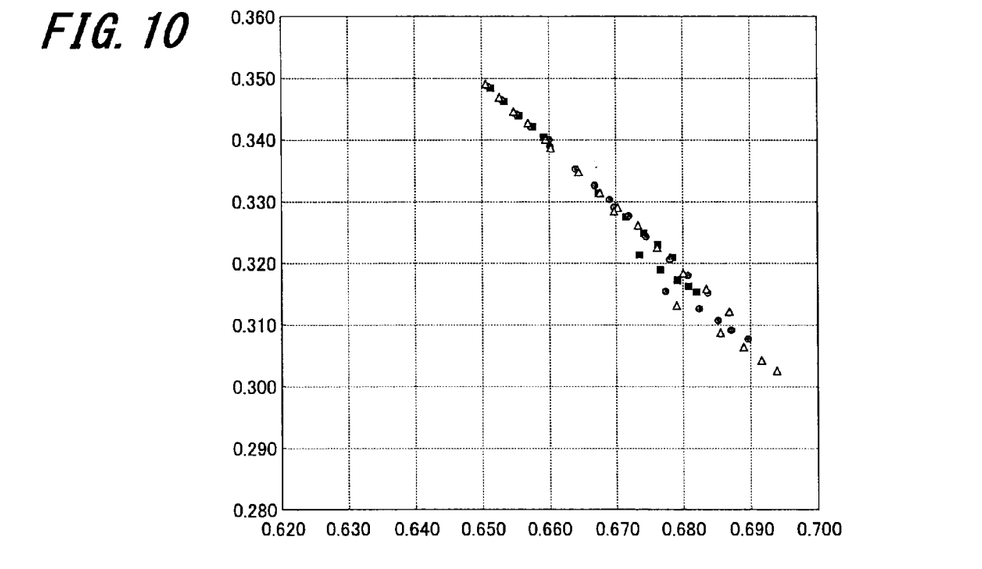
FIG. 10 is an explanatory diagram for explaining a chromaticity point, in a concrete example of a display device according to the present invention.

These results of Table 37 through Table 48 are organized on a chromaticity coordinate and are shown in FIG. 10.

Note that in FIG. 10, only the range of 0.620≦x≦0.700 and 0.280≦y≦0.360 is illustrated. Also, in FIG. 10, ■ corresponds to the results in Table 37 through Table 40, ⊚ corresponds to the results in Table 41 through Table 44, and Δ corresponds to the results in Table 45 through Table 48, respectively.

Example

Description is made with respect to an example of the present invention.

In the present example, description will be made with respect to a result of measuring the chromaticity point of red color by actually duplicating a part of the configuration in the above-described simulations and making a white LED using a red color filter and a fluorescent body.

In the display device according to the present example, a red color filter having the transmittance of 13% at the wavelength of 580 nm and the transmittance of 85% at the wavelength of 650 nm was made. This red color filter was made using pigments of color index (C.I.) numbers PX-254, PY-177 by mixing them and dispersing those having a predetermined mixing ratio in acrylic resin and coating them on a glass plate 1 μm-4 μm in thickness.

Also, in the present example, for the green fluorescent body, a fluorescent body having the composition shown by Chemical Formula 1 in which a=1 was used, and for the red fluorescent body, the one having the composition shown by Chemical Formula 2 in which the Eu density is 3 mol % was used. A white LED was made using these fluorescent bodies. The emission spectrum of the white LED was adjusted so that the ratio of the emission intensity of red color to the emission intensity of the green fluorescent body becomes 0.6. The white LED was made by arbitrarily adjusting the mixing ratio of the green fluorescent body and the red fluorescent body and mixing them in silicone resin, dropping the fluorescent-mixed resin on a blue LED, and thermally hardening them. Here, for the silicone resin, KJR639 of Shin-Etsu Chemical Co., Ltd. was used.

For measuring the chromaticity point, a luminance calorimeter was used.

As a result of performing characteristics evaluation under such conditions, the measured value of the red chromaticity point was (0.665, 0.324), and it has been confirmed that the result conforms to the above-described simulation result.

As described with reference to the above embodiment and example, according to the display device according to the present embodiment, it becomes possible to express a particularly superior red color.

That is, as an concrete example of this, according to the display device according to the present embodiment, in a back light system using a white LED (a display device equipped with a light source device), it becomes possible to obtain outputting of red color satisfying the red chromaticity point of the sRGB standard that was impossible to be accomplished with a conventional white LED when combined with an LCD panel (liquid crystal device).

Further, as described above, although the numerical values of respective parameters and their intervals in the simulations are not necessarily continuous or constant, these numerical values and intervals are defined in the range that can be said sufficiently fine in grasping the trend of the optical characteristics in a display device, and it is believed that in the vicinity of each numerical value, the trend substantially the same as that of the numeral value is shown.

Accordingly, it is believed that not only the device configuration having each measurement value itself but also, at least when the green fluorescent body and the red fluorescent body are fluorescent bodies of the compositions of Chemical Formula 1 and Chemical Formula 2, the device configuration in the vicinity of the measurement value also has the similar characteristics. Further, it is believed that particularly a group of chromaticity points, in which a virtual straight line connecting $(x_R, y_R)$ and $(x_G, y_G)$ passes only the points satisfying at least either of x≧0.640 and y≦0.330, corresponds to the device configuration example that is particularly easy to obtain red color expression of the sRGB standard. That is, it is believed that this device configuration example is particularly easy to be adjusted in the balance with the luminance that is easy to be deteriorated in configuring a display device, and is the one that can particularly easily obtain superior characteristics in both aspects of color reproducibility and luminance.

Note that the used materials and numerical conditions such as their amounts, processing time, dimensions, etc. are merely preferable examples, and the dimensions, shapes and arrangement relationship in respective figures used for explanation are rough ones. That is, the present invention is not limited to this embodiment.

For example, in the above-described embodiment, description has been made with respect to the study result on the emission intensity ratio, based on the emission intensity defined based on the peak intensity (maximum value) of a spectrum, however, the relationship between the emission intensity and the amount of a fluorescent body (for example, the number of particles of a fluorescent body per a unit volume) is not constant, and for example, changes depending on the particle diameter of the fluorescent body, etc. However, for example, with respect to the particle diameter, if it is excessively changed, there is a possibility that decreasing of the emission efficiency and the like are accompanied, and on the other hand, it is believed that as long as the particle diameter does not change excessively, the characteristics along the trend (general principle) found in the display device according to the present embodiment can be obtained.

Further, for example, the chromaticity point of red color that is finally outputted is influenced by the spectrum of a green fluorescent body, however, is hardly influenced by the spectrum of a blue color light that is more distant from red color. Accordingly, for the light-emitting body, not only the one bearing blue color, but also a light source of a short wavelength light other than a near-ultraviolet can be used, and in such case, a blue fluorescent body can be additionally used, and in this manner, various modifications and changes can be made in the present invention.

EXPLANATION OF REFERENCES

1: display device
2: light source device (back light device)

3: optical device (liquid crystal device)
4: reflector (reflective sheet)
5: reflector
6: light-emitting body
7: light-guiding unit
8: fluorescent unit
8a: first fluorescent unit
8b: second fluorescent unit
9: dispersion sheet
10: deflecting plate
11: TFT glass substrate
12: dot electrode
13: liquid crystal layer
14: alignment film
15: electrode
16: black matrix
17a: first color filter
17b: second color filter
17c: third color filter
18: glass substrate
19: deflecting plate
21: first prism sheet
22: second prism sheet

The invention claimed is:

1. A display device characterized in being equipped with a light source device including at least a light-emitting body, a green fluorescent body having a composition shown by a following Chemical Formula 1, and a red fluorescent body having a composition of a following chemical formula 2:

$(Ba_a Sr_{(2-a)})SiO_4:Eu$, wherein $0 \leq a \leq 2$,    Chemical Formula 1;

$CaAlSiN_3$:Eu, wherein an Eu density is 1 mol % to 6 mol %    Chemical Formula 2.

2. The display device described in claim 1, characterized in that the red chromaticity point $(x_R, y_R)$ with respect to emission of the red fluorescent body, in a chromaticity coordinate, satisfies $x_R \geq 0.640$ and $y_R \leq 0.330$.

3. The display device as described in claim 2, characterized in being equipped with:
a light source device including at least a light-emitting body, a green fluorescent body having a composition shown by the chemical formula 1, and a red fluorescent body having a composition shown by the chemical formula 2;
a green color filter; and
a red color filter,
wherein a green chromaticity point with respect to green color emission of the green fluorescent body and a red chromaticity point with respect to red color emission of the red fluorescent body are connected by a virtual straight line passing only a point satisfying at least either of $x \geq 0.640$ and $y \leq 0.330$.

4. The display device described in claim 3, characterized in that:
a transmittance of the red color filter is 30% or above and lower than 33% with respect to a wavelength of 580 nm, and 91% or above and lower than 94% with respect to a wavelength of 650 nm;
a ratio of an emission intensity of the red fluorescent body relative to an emission intensity of the green fluorescent body is greater than 1.0 and 1.5 or below;
a value of a in the Chemical Formula 1 satisfies $0 \leq a < 1$; and
a density of Eu composing the red fluorescent body is 1.0 mol % or above and 6.0 mol % or below,
wherein a combination that a density of Eu composing the red fluorescent body is 1.0 mol %, a ratio of an emission intensity of the red fluorescent body relative to an emission intensity of the green fluorescent body is smaller than 1.5, and a=0 is excluded.

5. The display device described in claim 3, characterized in that:
a transmittance of the red color filter is higher than 17% and lower than 30% with respect to a wavelength of 580 nm, and higher than 87% and lower than 91% with respect to a wavelength of 650 nm;
a ratio of an emission intensity of the red fluorescent body relative to an emission intensity of the green fluorescent body is greater than 0.6 and 1.5 or below;
a value of a in the Chemical Formula 1 satisfies $0 \leq a < 1$; and
a density of Eu composing the red fluorescent body is 1 mol % or above and 6 mol % or below,
wherein a combination that a density of Eu composing the red fluorescent body is 1.0 mol %, a ratio of an emission intensity of the red fluorescent body relative to an emission intensity of the green fluorescent body is 0.6 or above and 1.2 or below, and a=0 is excluded.

6. The display device described in claim 3, characterized in that:
a transmittance of the red color filter is higher than 17% and lower than 30% with respect to a wavelength of 580 nm, and higher than 87% and lower than 91% with respect to a wavelength of 650 nm;
a ratio of an emission intensity of the red fluorescent body relative to an emission intensity of the green fluorescent body is greater than 1.0 and 1.5 or below;
a value of a in the Chemical Formula 1 satisfies $1 \leq a < 1.5$; and
a density of Eu composing the red fluorescent body is 1 mol % or above and 6 mol % or below,
wherein a combination that a density of Eu composing the red fluorescent body is 1 mol %, a ratio of an emission intensity of the red fluorescent body relative to an emission intensity of the green fluorescent body is greater than 1.0 and 1.2 or below, and a=1 is excluded.

7. The display device described in claim 3, characterized in that:
a transmittance of the red color filter is higher than 13% and lower than 23% with respect to a wavelength of 580 nm, and higher than 85% and lower than 89% with respect to a wavelength of 650 nm;
a ratio of an emission intensity of the red fluorescent body relative to an emission intensity of the green fluorescent body is 0.6 or above and 1.5 or below;
a value of a in the Chemical Formula 1 satisfies $0 \leq a < 1$; and
a density of Eu composing the red fluorescent body is 1 mol % or above and 6 mol % or below.

8. The display device described in claim 3, characterized in that:
a transmittance of the red color filter is higher than 13% and lower than 23% with respect to a wavelength of 580 nm, and higher than 85% and lower than 89% with respect to a wavelength of 650 nm;
a ratio of an emission intensity of the red fluorescent body relative to an emission intensity of the green fluorescent body is greater than 0.6 and 1.5 or below;
a value of a in the Chemical Formula 1 satisfies $1 \leq a < 1.5$; and
a density of Eu composing the red fluorescent body is 1 mol % or above and 6 mol % or below,
wherein a combination that a density of Eu composing the red fluorescent body is 1.0 mol %, a ratio of an emission intensity of the red fluorescent body relative to an emission intensity of the green fluorescent body is greater than 0.6 and 0.8 or below, and a=1 is excluded.

9. The display device described in claim 3, characterized in that:
a transmittance of the red color filter is higher than 13% and lower than 23% with respect to a wavelength of 580 nm, and higher than 85% and lower than 89% with respect to a wavelength of 650 nm;
a ratio of an emission intensity of the red fluorescent body relative to an emission intensity of the green fluorescent body is greater than 1.2 and 1.5 or below;
a value of a in the Chemical Formula 1 satisfies $1.5 \leq a < 2.0$; and
a density of Eu composing the red fluorescent body is greater than 3 mol % and 6 mol % or below.

10. The display device described in claim 3, characterized in that:
a transmittance of the red color filter is 9% or above and 13% or below with respect to a wavelength of 580 nm, and 81% or above and 85% or below with respect to a wavelength of 650 nm;
a ratio of an emission intensity of the red fluorescent body relative to an emission intensity of the green fluorescent body is 0.6 or above and 1.5 or below;
a value of a in the Chemical Formula 1 satisfies $0 \leq a < 1.5$; and
a density of Eu composing the red fluorescent body is 1 mol % or above and 6 mol % or below.

11. The display device described in claim 3, characterized in that:
a transmittance of the red color filter is 9% or above and 13% or below with respect to a wavelength of 580 nm, and 81% or above and 85% or below with respect to a wavelength of 650 nm;
a ratio of an emission intensity of the red fluorescent body relative to an emission intensity of the green fluorescent body is greater than 1.0 and 1.5 or below;
a value of a in the Chemical Formula 1 satisfies $1.5 \leq a < 2$; and
a density of Eu composing the red fluorescent body is 1 mol % or above and 6 mol % or below,
wherein a combination that a density of Eu composing the red fluorescent body is 1.0 mol %, a ratio of an emission intensity of the red fluorescent body relative to an emission intensity of the green fluorescent body is greater than 1 and 1.2 or below, and a=1.5 is excluded.

12. The display device as described in claim 1, wherein the light-emitting body is dichromatic.

13. The display device as described in claim 1, wherein the only fluorescent bodies in the light-emitting body are the green fluorescent body and the red fluorescent body.

14. The display device as described in claim 13, wherein the red and green fluorescent bodies have emission peaks in a wavelength band of 510-550 nm and 610-670 nm.

15. The display device as described in claim 1, wherein the green fluorescent body and the red fluorescent body provide only a first emission with a peak wavelength in a wavelength band of 510-550 nm and a second emission with a peak wavelength in a wavelength band of 610-670 nm.

16. The display device as described in claim 15, wherein the green fluorescent body and the red fluorescent body are present in separate domains of a fluorescent unit.

17. The display device as described in claim 16, further comprising, in the following order, a dispersion sheet, a deflecting plate, a thin film transistor glass substrate, a dot electrode, an alignment film, a liquid crystal layer, an alignment film, and electrode and a black matrix.

18. The display device as described in claim 17, further comprising a light-emitting unit in direct contact with the fluorescent unit opposite the dispersion sheet.

19. The display device as described in claim 1, wherein the green fluorescent body and the red fluorescent body provide a first emission peak in a wavelength band of 510-550 nm and a second emission peak in a wavelength band of 610-670 nm.

* * * * *